United States Patent [19]

McCormick

[11] 4,265,420
[45] May 5, 1981

[54] CLIP FOR FIXING AN ELECTRIC CABLE TO A SUPPORT STRUCTURE

[75] Inventor: Mathew McCormick, East Didsbury, England

[73] Assignee: Bowthorpe-Hellermann Limited, Crawley, England

[21] Appl. No.: 87,210

[22] Filed: Oct. 22, 1979

[30] Foreign Application Priority Data

Nov. 27, 1978 [GB] United Kingdom ............... 46109/78

[51] Int. Cl.³ ................................................ F16L 5/00
[52] U.S. Cl. ................................... 248/56; 174/153 G
[58] Field of Search ........... 248/56; 174/153 G, 65 G; 16/2; 285/159; 24/265 R, 16 PB

[56] References Cited

U.S. PATENT DOCUMENTS

| 2,490,286 | 12/1949 | Tornblom | 285/159 |
| 3,197,556 | 7/1965 | Simon | 174/153 G |
| 4,056,252 | 11/1977 | Simon | 174/153 G |

FOREIGN PATENT DOCUMENTS 2316747 10/1974 Fed. Rep. of Germany ...... 174/153 G
1070214 6/1967 United Kingdom ...................... 248/56

Primary Examiner—J. Franklin Foss
Attorney, Agent, or Firm—Laubscher & Laubscher

[57] ABSTRACT

A clip for fixing an end of an electric cable to a support panel, comprises a hollow, tubular body portion and a clamping portion to be introduced into one end of the body portion. A screw passes through the panel, through an opening in the opposite end of the body portion and is threaded in the clamping portion. When the screw is tightened, it draws the clamping portion into the body portion to clamp the cable between an inclined surface of the body portion on a surface of the clamping portion, and also the screw secures the clip to the panel. This surface of the clamping portion is provided with a V-section groove so as to be effective in clamping cables of different diameters.

3 Claims, 4 Drawing Figures

U.S. Patent    May 5, 1981    4,265,420 they will be securely clamped to that appliance so that the cable will not be pulled free. Our British patent specification 1 070 214 describes and claims an effective clip, having a hollow, tubular body portion through which the cable passes, and a clamping portion to be introduced into one end of the body portion: the two portions are drawn together by a screw so that the clamping portion clamps the cable against an inclined inside surface of the body portion, the screw also serving to secure the clip to a support structure.

CLIP FOR FIXING AN ELECTRIC CABLE TO A SUPPORT STRUCTURE

BACKGROUND OF THE INVENTION

This invention relates to a clip for fixing an electric cable to a support structure, particularly for clamping to an electrical appliance a cable passing into the latter.

In the case of a cable passing into an electrical appliance, it is important for the cable to be securely clamped to that appliance so that the cable will not be pulled free. Our British patent specification 1 070 214 describes and claims an effective clip, having a hollow, tubular body portion through which the cable passes, and a clamping portion to be introduced into one end of the body portion: the two portions are drawn together by a screw so that the clamping portion clamps the cable against an inclined inside surface of the body portion, the screw also serving to secure the clip to a support structure.

Our U.S. Pat. No. 4,178,057 describes a modified clip in which the tubular body portion has at least two screw-type electrical terminals mounted thereon for terminating respective conductors of the cable.

The above described clips are not able to cope with a large range of diameter of the different cables for which it may be used and the present invention aims to overcome this disadvantage.

SUMMARY OF THE INVENTION

This invention provides a clip for fixing an end of an electric cable to a support panel, the clip comprising a hollow, tubular body portion of synthetic plastic material for the cable to extend through, a synthetic plastic clamping portion to be introduced into one end of the body portion and formed with a bore, and a threaded screw for passing through an aperture in the support panel, through an opening in the opposite end of the body portion and into the bore of said clamping portion, the screw serving, upon tightening, to draw the clamping portion further into the body portion so as to clamp the cable between a clamping surface of the clamping portion and an inside inclined surface of the body portion and to clamp the support panel between the screw head and the other end of the body portion, one of the surfaces being formed with a tapering groove to accommodate different cables over a range of diameters.

BRIEF DESCRIPTION OF THE FIGURES

An embodiment of cable fixing clip will now be described, by way of example only, with reference to the accompanying drawing, in which.

DETAILED DESCRIPTION

Figure 1:
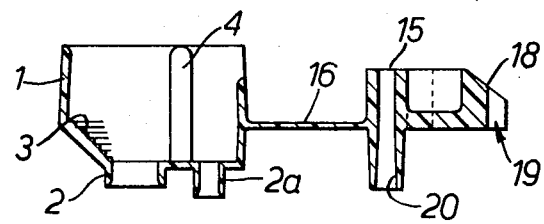
FIG. 1 is a longitudinal section through a clip in its as molded condition.
Figure 2:
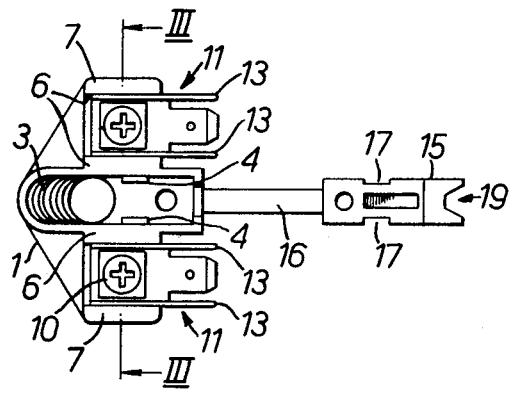
FIG. 2 is a plan view of the clip.

Referring to the drawings, there is shown a cable fixing clip formed as a one-piece molding of synthetic plastic material and having two metal terminals secured thereto. The one-piece molding comprises a hollow, tubular body portion 1 having a generally rectangular opening at its upper end and a circular opening 2, formed as a tubular extension, in an end wall at its lower end. A curved interior surface 3, provided with transverse serrations, extends from the bottom of the body portion, along an inclined line, part way to the top of the body, whereafter the sides of the body portion are parallel, the body portion thus being wider at the top than at the bottom. The inside opposite side walls of the body portion are provided with respective parallel ribs 4 extending from top to bottom of the body portion. The bottom end wall of the body portion is provided with a small circular opening, in the form of a tubular extension 2a.

Figure 3:
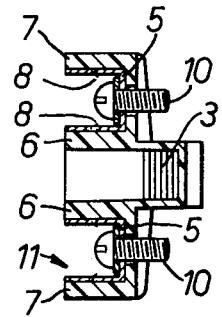
FIG. 3 is a section on the line III—III of FIG. 2.

Part way up, the opposite side walls of the body portion are provided with respective extensions to which respective metal terminals are secured. Each such extension is in the form of a U-shaped channel, with a floor 5, an inner wall 6 on the outside of the main side wall of the body portion, and a parallel outer wall 7. The two side walls 6, 7 are provided with projections 8 having inclined surfaces as shown in FIG. 3. The floor 5 is formed with an aperture to receive freely the end of a terminal screw 10.

As shown, each metal terminal 11 is formed from sheet metal bent into U-section. One end portion is provided with rectangular apertures in the opposite side walls, for location of the projections 8 therein, the floor of this portion of the terminal seating on the floor 5 of the plastics body portion extension. By virtue of the inclined surfaces on the projections 8 and the slight resilience of the synthetic plastic material (preferably nylon), the terminal is snap-engageable with the extension. The floor of the terminal is screw threaded to receive screw 10. The terminal has an opposite end portion, wherein each of the two opposite side walls and the floor are formed as blades 13 for receiving complementary socket-type terminals of connecting leads (not shown).

The clip also comprises a clamping portion 15 which is united to the body portion by an elongate flexible strap 16. The clamping portion is arranged to enter the open top end of the body portion and opposite sides thereof are provided with grooves 17 for the ribs 4 to locate slidingly within. The clamping portion has its free end formed with a V-groove 19, with the axis of a bore 20 being parallel to the sides of this groove, and one corner is cut away on an incline, at 18, so as to form a clamping surface disposed on an incline so as to lie parallel to the surface 3 of the body portion when the clamping portion is introduced into the body portion. The through bore 20 is parallel with the grooves 17.

Figure 4:
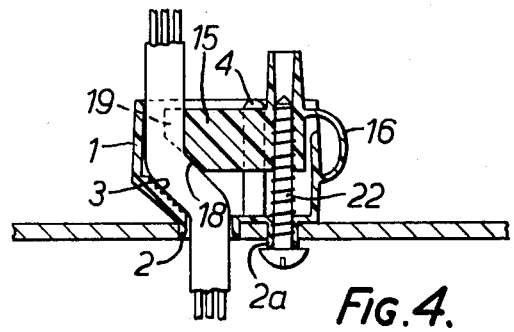
FIG. 4 is a longitudinal section of the clip when installed securing a cable to a support panel.

In use, the tubular extensions 2, 2a at the bottom end of the body portion are registered in complementary openings in a support structure, such as a panel as shown in FIG. 4. A mains cable is passed through the body portion, from the bottom end thereof, and the clamping portion is bent around on its flexible strap and pushed into the open top end of the body portion, so that the ribs 4 locate within the grooves 17. A self-tapping screw 22 is inserted through the body portion extension and engages within the through-bore 20 of the clamping portion. As this screw 22 is tightened, the clamping portion is drawn further into the body portion and securely clamps the cable against the interior surface 3 of the body portion. The screw 22 also flattens the extension onto the supporting structure, thus serving to secure the clip to the latter. The individual leads of the cable are connected to the terminals 11 by means of the terminal screws 10, and other suitable terminated connecting leads may be engaged with the terminal blades 13.

The V-groove 19 of the clamping portion receives the cable and the opposite sides of the V-groove engage opposite side portions of the cable, which is also clamped between the groove 19 and the curved serrated surface 3 of the body portion. Cables of different diameters are accommodated in that, the smaller the cable diameter, the further the cable will enter the groove 19 and the further the clamping portion will enter the body portion.

I claim:

1. A clip for securing an electrical cable to a support panel containing a pair of adjacent openings, comprising
  (a) a body member (1) the upper portion of which contains a recess defining a chamber, the bottom wall of said chamber containing first and second openings (2, 2a) aligned with the support panel openings, respectively, said first body member opening and the corresponding panel opening being adapted to receive the cable, a portion of the chamber bottom wall having an upwardly inclined surface (3) adjacent said first opening;
  (b) a clamping member (15) arranged within said body chamber, said clamping member containing a vertical bore (20) aligned with said second body member opening, the lower surface of said clamping member including a clamping surface (18) opposite said inclined surface, one side surface of said clamping member adjacent said clamping surface containing a vertical groove (19) having in horizontal cross-section a tapered configuration, said clamping member one side surface being adjacent and spaced from the adjacent chamber side wall; and
  (c) a vertical screw (22) having at its lower end a head portion, said screw extending upwardly through said second opening and having a threaded portion threadably connected within said clamping member bore, whereby when the cable extends upwardly through said first body member opening via the associated panel opening, between said inclined and clamping surfaces and upwardly in said groove, and when said screw extends upwardly through said second body member opening via the associated panel opening and into threaded engagement with said bore, tightening of the screw simultaneously secures the body member to the support panel and draws the clamping member downwardly to securely clamp the cable between said clamping and inclined surfaces, the cable being clamped in said groove by said chamber side wall.

2. Apparatus as defined in claim 1, wherein said tapered groove comprises a V-groove.

3. Apparatus as defined in claim 2, wherein said clamping surface is arranged parallel with said body member inclined surface.

* * * * *